R. LINN.
ANTIFRICTION BEARING.
APPLICATION FILED APR. 13, 1908.
1,124,754.
Patented Jan. 12, 1915.
2 SHEETS—SHEET 1.
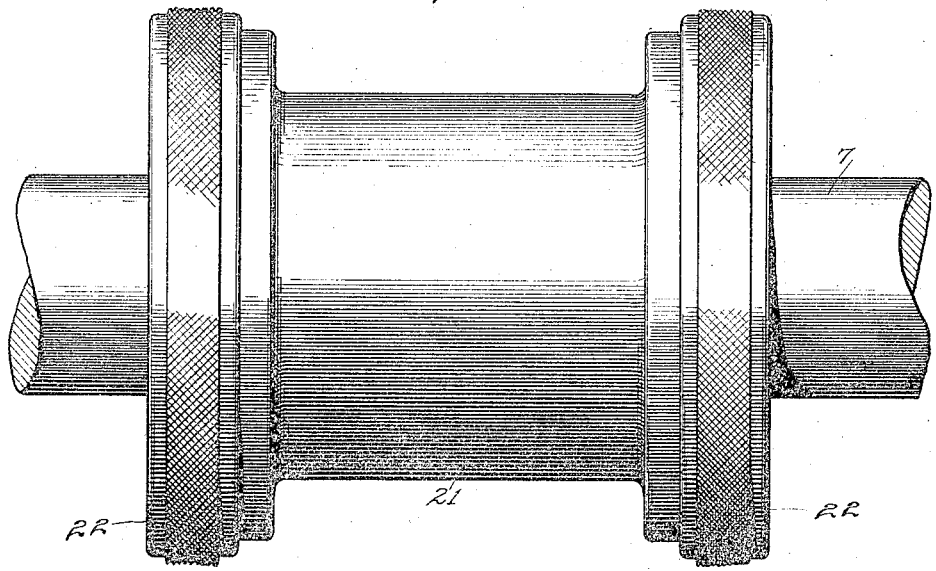
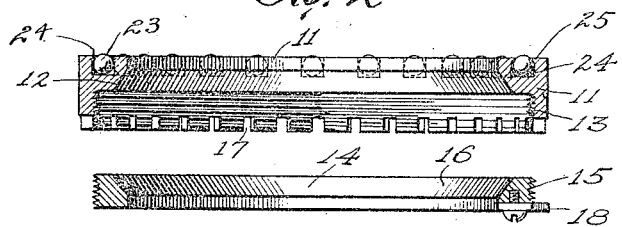
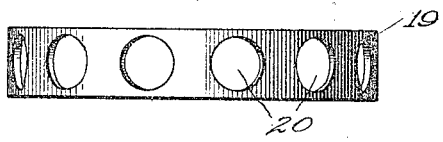
Witnesses
E. H. Lichtenberg
A. W. Wenstemaker
Inventor
Robert Linn
by Glenn S. Noble
Atty.

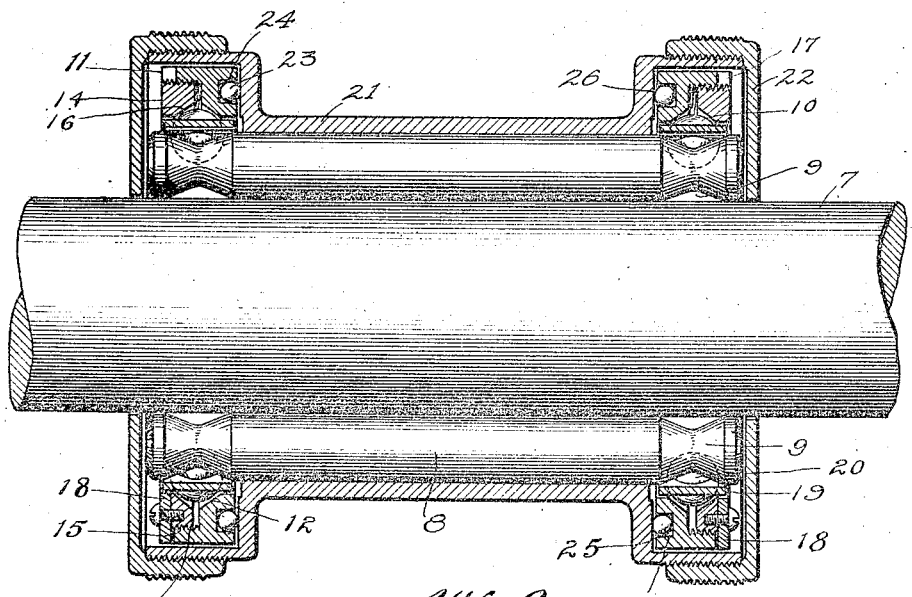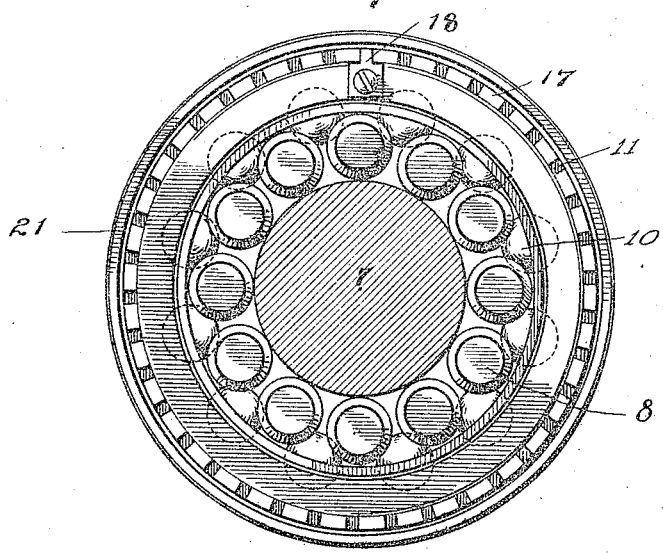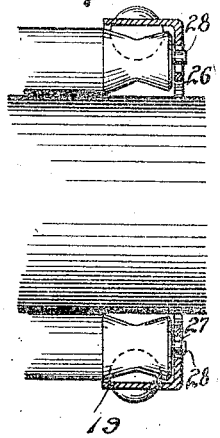

UNITED STATES PATENT OFFICE.

ROBERT LINN, OF CHICAGO, ILLINOIS.

ANTIFRICTION-BEARING.

1,124,754.	Specification of Letters Patent.	Patented Jan. 12, 1915.

Application filed April 13, 1908. Serial No. 426,844.

*To all whom it may concern:*

Be it known that I, ROBERT LINN, a citizen of the United States, residing at Chicago, in the county of Cook and State of Illinois, have invented certain new and useful Improvements in Antifriction-Bearings, of which the following is a specification.

This invention relates more particularly to bearings used in connection with revolving shafting and stationary boxes or supports; or stationary shafting, axles or the like and revolving members such as pulleys or wheels. Its objects are to provide a simple and efficient bearing in which friction is reduced to a minimum and in which there is no sliding movement, practically all of the moving parts tending to roll upon or with the adjacent members. I attain these objects, and such other objects as will appear hereinafter, by means of the devices shown in the accompanying drawings in which—

Figure 1 shows a side elevation of one form of my device; Fig. 2 is a detail showing one part of the ball-retaining ring in cross-section; Fig. 3 is a similar view of the other part of the ball-retaining ring; Fig. 4 is a side view of the ball-spacing ring; Fig. 5 is a sectional view through the bearing, the shaft being shown in elevation; Fig. 6 is an end view of the bearing, with the cap removed; and Fig. 7 is a detail showing a modified form of the ball-spacing ring which is also adapted to support the rollers when the shaft is removed.

As shown in these drawings, 7 represents a shaft or axle about which is arranged a plurality of rollers 8 which engage therewith and are adapted to take up the principal wear and strain of the bearing. These rollers are grooved at the ends as indicated at 9 and are held at fixed distances apart by means of balls 10 which engage with the grooved portions of said rollers. The rollers are arranged sufficiently close together and the balls are of such size that the centers of said balls are beyond the centers of said rollers and the balls extend for some distance beyond said rollers at the point of contact. These balls are held in position by means of a retaining ring which is grooved to engage with said balls. I prefer to make this ring in two parts to permit of assembling and adjustment, one of said parts consisting of an annulus 11 beveled at 12 to form one part of the ball race and threaded at 13 for engagement with a second annulus 14 which is threaded at 15 to screw into the part 11. This second annulus is beveled as shown at 16 to form the other face of the ball race. The annulus 11 is provided with a series of notches 17 around the outer edge thereof and the annulus 14 is provided with a catch or tongue 18 for engagement with any one of these notches. It will be readily seen that when the parts are assembled as shown in Fig. 5, the position of the balls may be readily adjusted by tightening or loosening the annulus 14, and when the retaining ring has been properly adjusted the parts are held in position by means of the catch 18 engaging with one of the notches 17. While, in some instances, this retaining ring may be sufficient to keep the balls and rollers in proper position, I also have a spacing or equalizing ring 19 having holes 20 therein to receive the balls 10. This is a light ring which engages with about the centers of the balls and prevents circumferential displacement thereof while at the same time affording little opportunity for any friction with said balls. As this ring holds the balls in adjusted position, the rollers will always be spaced at equal distances apart.

The hub, box or sleeve 21, which engages with the rollers 8, may be made in any desired form to suit the particular use for which the bearing is to be used. As shown in the drawings, it consists of a cylindrical portion which engages with said rollers and is enlarged at the ends to cover and inclose the balls and rings above described. These enlarged ends are threaded to receive caps or covers 22 which entirely close the ends of the bearings and protect the rollers and spacing devices from dust and dirt.

In order to prevent friction between the ends of the box 21 and the retaining rings, I have provided a series of balls 23 which are placed in shallow holes 24 in the annulus 11 and are held in position by slightly upsetting the metal around the outer edge of the holes as indicated at 25. These balls project beyond the face of the annulus 11 and engage with the shoulders 26 on the hub or box 21.

The operation of my improved bearing, which may be applied to various journals, will be readily understood from the above description. When used, for instance, as a bearing for shafting, the shaft 7 when turned will roll on the rollers 8 and these in turn will roll around in the stationary box 21. The balls 10 will hold the rollers in adjusted position so that they will not rub or engage one with another, said balls rotating in the opposite direction from the rollers. These balls in turn will revolve around in the retaining ring; but as this retaining ring is in the nature of a floating ring, it will move around with said balls and will adjust itself to the speed of said balls and thereby lessen the friction at this point. The spacing or equalizing ring in the meantime assists in maintaining the accurate relative positions of the parts. The threaded annuli, with the locking device therefor, provides a delicate and accurate means for adjustment when the parts are to be assembled or to take up any wear occasioned by the operation of the device.

In some instances it is desirable to provide means for maintaining the rollers in their relative operative positions when they are removed from the shaft or axle, as for instance, when a completed bearing is to be shipped for placing on a standard size of shaft. For this purpose, I provide the rollers with small pins or trunnions 28, as indicated in Fig. 7, and arrange a disk or ring 26' with holes 27 therein for receiving said trunnions. This disk is preferably made integral with the ring 19 heretofore described, and it will be noted that the holes 27 are sufficiently large so that in normal operation the trunnions will not engage with the disk; but when the central shaft has been removed, the trunnions will then engage with the disk and thereby prevent the rollers from being displaced.

Various changes in the details of construction will readily suggest themselves as coming within the scope of this invention when it is desired to utilize the same for various purposes, and I do not wish to be limited to the exact construction or details herein set forth; but

What I claim and desire to secure by Letters Patent is:

1. In an antifriction bearing, the combination of a journal or shaft, bearing balls, rollers provided with transverse grooves adapted for said balls, rings for retaining said balls, a box engaging with said rollers and having shoulders at its ends, and balls in said rings adapted to engage with said shoulders to prevent lateral motion.

2. As a new article of manufacture, a bearing comprising a journal, grooved rollers adapted to engage with said journal, balls engaging with the grooved portions of said rollers to hold them apart, means for holding said balls in contact with the rollers, and a ring having holes therethrough for engagement with the balls, the arrangement being such that the ring tends to keep said balls in normal, spaced apart position around the journal.

3. In a bearing, the combination of a shaft, grooved rollers engaging with said shaft, balls engaging with the grooved portions of said rollers for holding said rollers apart, an adjustable retaining ring for said balls, and a spacing ring having holes therethrough of greater diameter than the balls for engagement with said balls.

4. In a device of the character set forth, the combination of a shaft, rollers having grooves in the ends thereof, adapted to engage with said shaft, rotatable members engaging with said rollers for holding the same apart, spacing rings engaging with said rotatable members, retaining rings engaging with said rotatable members, a box or hub engaging with said rollers and having shoulders at the ends thereof, and balls in said retaining rings for engagement with said shoulders.

5. In a device of the character set forth, the combination of a shaft, rollers having grooves at the ends thereof and engaging with said shaft, balls engaging with the grooved ends of said rollers, spacing rings engaging with said balls, an adjustable ring engaging with said balls, means for holding the parts of said ring in adjusted position, said ring being free to move with said balls, a box engaging with said rollers and having shoulders thereon, balls in said adjustable rings engaging with said shoulders, and caps engaging with the said box for closing the ends of the bearing.

6. In a roller bearing, the combination of a plurality of grooved rollers, having pins at the ends thereof, balls adapted to engage with said grooves to hold said rollers at predetermined distances apart, and a spacing ring for said balls, having a flange thereon provided with holes for receiving said pins.

7. In an antifriction bearing, the combination of a shaft or axle, grooved rollers engaging with said shaft, means for holding said rollers apart, and a retaining disk having enlarged holes for receiving trunnions on the ends of said rollers, the arrangement being such that the trunnions will ordinarily be free from said disk but will engage with the same to hold the rollers in relative positions when the shaft is removed.

8. In a roller bearing, the combination of grooved rollers having trunnions at the ends thereof, balls for holding said rollers apart, and a ring having holes to receive said balls, said ring being provided with a flange having holes to receive said trunnions for the purpose of supporting said rollers when the bearing shaft is absent.

ROBERT LINN.

Witnesses:
WM. E. HAMILTON,
A. W. FENSTEMAKER.